US008604744B2

(12) United States Patent
Takai et al.

(10) Patent No.: US 8,604,744 B2
(45) Date of Patent: Dec. 10, 2013

(54) MOTOR DRIVE CIRCUIT FOR ROTATING A ROTOR BY SUPPLYING THE CURRENTS TO TWO COILS

(75) Inventors: Kazumasa Takai, Kagamigahara (JP); Takeshi Naganuma, Inazawa (JP); Kosaku Hioki, Ogaki (JP); Yoshihiro Niwa, Gifu (JP)

(73) Assignees: Semiconductor Components Industries, LLC, Phoenix, AZ (US); Sanyo Semiconductor Co., Ltd., Gunma (JP)

( * ) Notice: Subject to any disclaimer, the term of this patent is extended or adjusted under 35 U.S.C. 154(b) by 387 days.

(21) Appl. No.: 12/978,958

(22) Filed: Dec. 27, 2010

(65) Prior Publication Data

US 2011/0156631 A1    Jun. 30, 2011

(30) Foreign Application Priority Data

Dec. 28, 2009  (JP) ................. 2009-297568

(51) Int. Cl.
*G05B 19/40* (2006.01)
(52) U.S. Cl.
USPC .......................................... 318/685; 318/696
(58) Field of Classification Search
USPC ............... 318/459, 500, 685, 696; 388/928.1
See application file for complete search history.

(56) References Cited

U.S. PATENT DOCUMENTS

| | | | | |
|---|---|---|---|---|
| 4,658,194 A * | 4/1987 | Richter et al. | ................ | 318/696 |
| 6,861,817 B2 * | 3/2005 | Pigott et al. | .................. | 318/685 |
| 7,183,734 B2 * | 2/2007 | Lassen | ..................... | 318/400.34 |
| 7,288,956 B2 * | 10/2007 | De Cock et al. | ......... | 324/765.01 |
| 7,906,928 B2 * | 3/2011 | Ito et al. | ....................... | 318/459 |
| 8,058,894 B2 * | 11/2011 | De Cock | ................. | 324/765.01 |

FOREIGN PATENT DOCUMENTS

| | | |
|---|---|---|
| JP | 07-236299 | 9/1995 |
| JP | 08-037798 | 2/1996 |
| JP | 2002-204592 A | 7/2002 |
| JP | 2006-288056 | 10/2006 |
| WO | 96/18237 A1 | 6/1996 |

OTHER PUBLICATIONS

Japanese Office Action, w/ English translation thereof, issued in Japanese Patent Application No. JP 2009-297568 dated Oct. 29, 2013.

* cited by examiner

*Primary Examiner* — Rina Duda
(74) *Attorney, Agent, or Firm* — McDermott Will & Emery LLP

(57) ABSTRACT

When a driver unit is in a high impedance state as viewed from a first coil or a second coil, an induced voltage detector detects the voltage across the first coil or that across the second coil so as to detect an induced voltage occurring in the first coil or the second coil. The induced voltage detector includes a differential amplifier circuit for differentially amplifying an electric potential across the first coil or that across the second coil, and an analog-to-digital converter circuit for converting an analog value outputted from the differential amplifier circuit into a digital value and outputting the converted digital value to a control unit. The control unit generates a drive signal based on an input signal set externally and adjusts the drive signal in accordance with the induced voltage detected by the induced voltage detector so as to set the adjusted drive signal in the driver unit.

4 Claims, 8 Drawing Sheets

MOTOR DRIVE CIRCUIT FOR ROTATING A ROTOR BY SUPPLYING THE CURRENTS TO TWO COILS

CROSS-REFERENCE TO A RELATED APPLICATION

This application is based upon and claims the benefit of priority from the prior Japanese Patent Applications No. 2009-297568, filed on Dec. 28, 2009, the entire contents of which are incorporated herein by reference.

BACKGROUND OF THE INVENTION

1. Field of the Invention

The present invention relates to a motor drive circuit that rotates a rotor by supplying the currents of different phases to two coils.

2. Description of the Related Art

There are a variety of types of motors available. A typical example of such motors capable of accurately determining the positions is a stepping motor which is widely in use and applicable to various types of apparatuses. For example, the stepping motor is used to focus a lens group in a camera, correct a shake, position a machine tool and so forth.

In a general stepping motor, the rotational position of a rotor is controlled by the phase difference between the currents supplied to two stator coils. Nevertheless, when the currents supplied to the stator coils are too low, the torque is too small and the synchronism may possibly be lost. In order to robustly rotate the rotor, therefore, a relatively large current is preferably supplied to the status coils.

At the same time, there is demand that the power consumed by electric equipment be minimized. Such demand is particularly strong in the field of portable devices or the like driven by batteries. Thus, a drive system capable of being driven with a lower power consumption while suppressing the loss of synchronism is in great demand.

SUMMARY OF THE INVENTION

A drive circuit according to one embodiment of the present invention is a drive circuit for a motor having a first coil, a second coil and a rotor, and the motor drive circuit comprises: a driver unit configured to supply currents, whose phase differ from each other, to the first coil and the second coil, respectively; an induced voltage detector configured to detect a voltage across the first coil or that across the second coil when the driver unit is in a high impedance state as viewed from the first coil or the second coil, and configured to detect an induced voltage occurring in the first coil or the second coil; and a control unit configured to generate a drive signal based on an input signal set externally and adjust the drive signal in accordance with the induced voltage detected by the induced voltage detector so as to set the adjusted drive signal in the driver unit. The induced voltage detector includes: a differential amplifier circuit configured to differentially amplify an electric potential across the first coil or that across the second coil; and an analog-to-digital converter circuit configured to convert an analog value outputted from the differential amplifier circuit into a digital value and output the converted digital value to the control unit.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Figure 1:
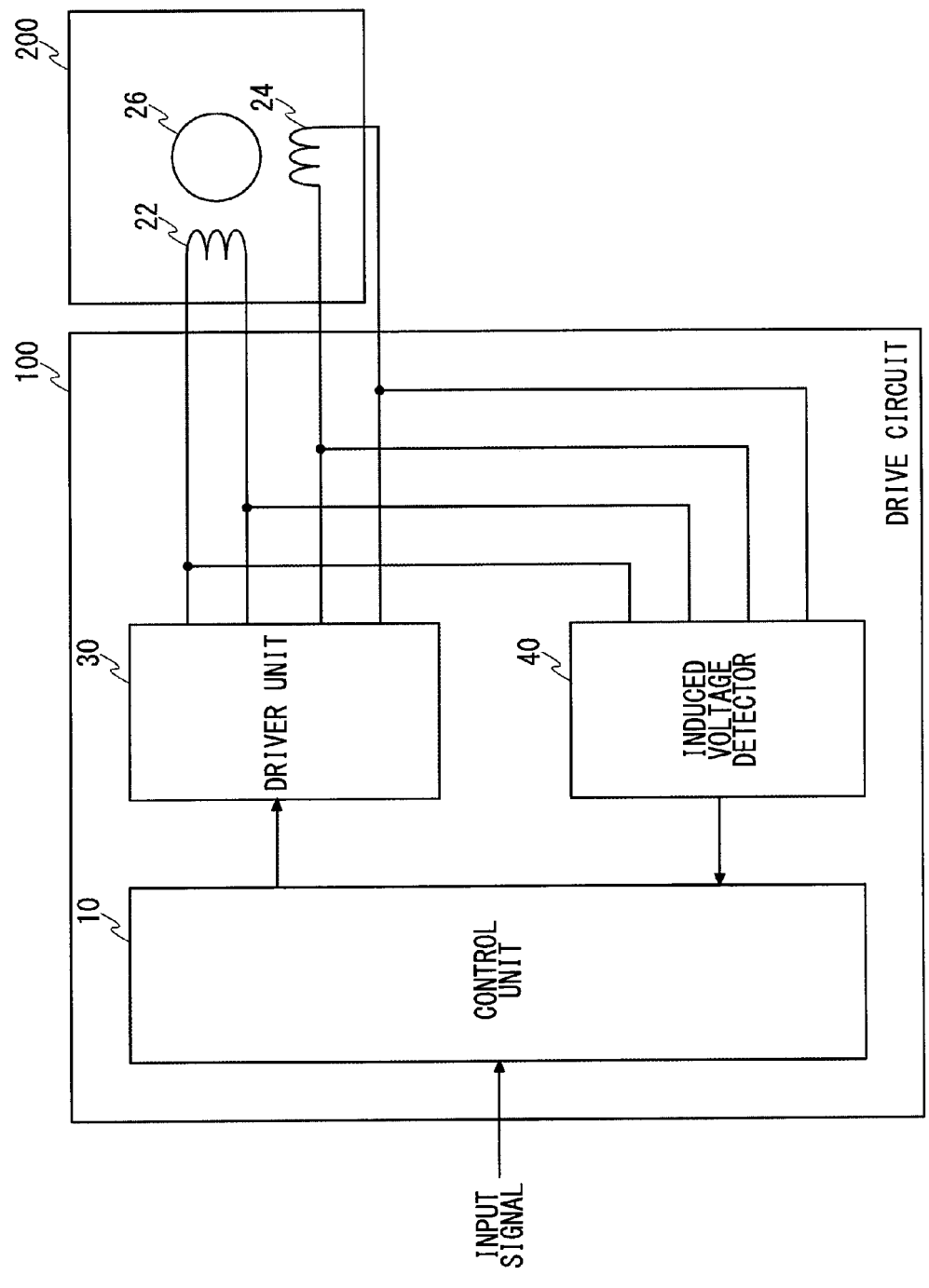
FIG. 1 illustrates a structure of a stepping motor and its drive circuit.

FIG. 1 illustrates a structure of a stepping motor 200 and its drive circuit 100. An input signal supplied from a not-shown control apparatus of the stepping motor 200 is inputted to a drive circuit 100. The drive circuit 100 supplies a drive current in response to the input signal, to the stepping motor 200. Thereby, the rotation of the stepping motor 200 is controlled in accordance with the input signal.

The stepping motor 200 includes a first coil 22, a second coil 24 and a rotor 26. The first coil 22 and the second coil 24 are mutually displaced at an angle of 90 electrical degrees. Thus, the magnetic orientations of the first coil 22 and the second coil 24 relative to the rotor 26 are also mutually displaced at an angle of 90 electrical degrees with respect to the center angle of the rotor 26.

The rotor 26 includes a magnetic body such a permanent magnet, and the stable positions of the rotor 26 are determined according to the magnetic field from the first coil 22 and the second coil 24. The drive circuit 100 supplies the alternate currents, whose phases differ mutually by 90 degrees, to the first coil 22 and the second coil 24, respectively. As a result, a difference is caused between the phase of current in the first coil 22 and that in the second coil 24 so as rotate the rotor 26.

Also, the drive circuit 100 stops the change in the phase of current with specific timings, so that the rotor 26 can be stopped at specific positions according to the current phases of their timings. With these processings, the rotation of the stepping motor 200 can be controlled.

A detailed description is hereunder given of the drive circuit 100. The drive circuit 100 includes a control unit 10, a driver unit 30, an induced voltage detector 40. The control unit 10 generates a drive signal based on the input signal set externally so as to set the driver unit 30. The driver unit 30 rotates the rotor 26 by supplying the currents, whose phases differ from each other, to the first coil 22 and the second coil 24, respectively.

Figure 2:
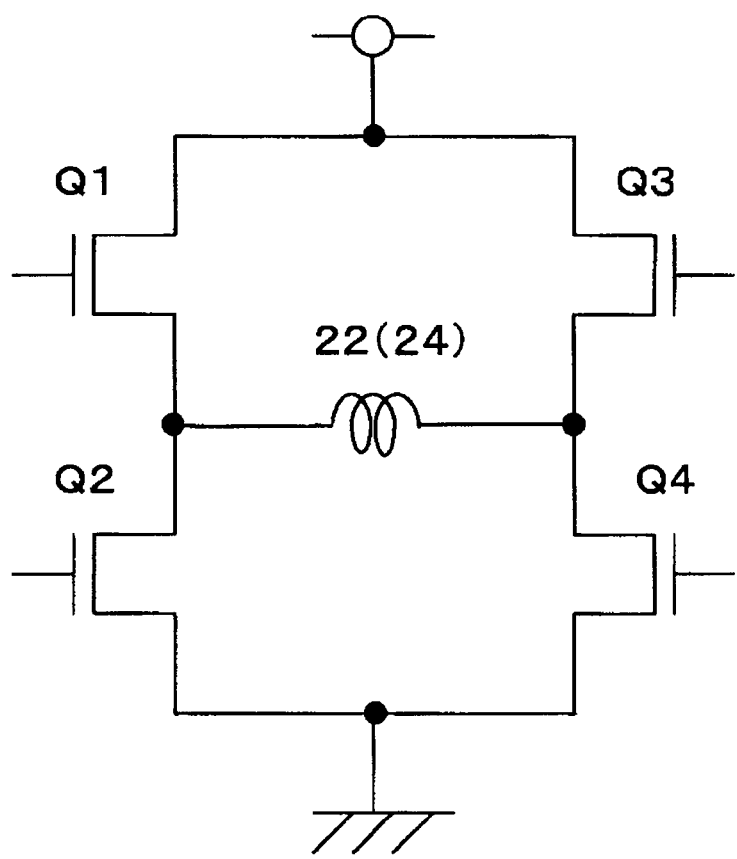
FIG. 2 is an illustration for explaining an exemplary structure of a driver unit.

FIG. 2 is an illustration for explaining an exemplary structure of the driver unit 30. In this exemplary structure as shown in FIG. 2, an H-bridge circuit drives the first coil 22. The H-bridge circuit includes a first transistor Q1, a second transistor Q2, a third transistor Q3, and a fourth transistor Q4. A first series circuit, formed by the first transistor Q1 and the second transistor Q2, and a second series circuit, formed by the third transistor Q3 and the fourth transistor Q4, are each connected between the power supply and the ground. The first coil 22 is connected between a connection point of the first transistor Q1 and the second transistor Q2 and a connection point of the third transistor Q3 and the fourth transistor Q4.

In this configuration, a forward current flows through the first coil 22 when the first transistor Q1 and the fourth transistor Q4 are turned on and the second transistor Q2 and the third transistor Q3 are turned off. Also, the reverse current flows through the first coil 22 when the first transistor Q1 and the fourth transistor Q4 are turned off and the second transistor Q2 and the third transistor Q3 are turned on.

Similar to the first coil 22, the second coil 24 can be driven by the H-bridge circuit. Two of such H-bridge circuits are provided here, so that the first coil 22 and the second coil 24 can be controlled independently.

Refer now back to FIG. 1. When the driver unit 30 is constituted by the H-bridge circuits, the control unit 10 generates a pulse width modulation (PWM) signal, having a duty ratio corresponding to the aforementioned input signal, as the drive signal and supplies the PWM signal to gate terminals of the transistors that constitute the above-described H-bridge circuits. That is, the power supplied from the first coil 22 and the second coil 24 is controlled by the PWM signal.

The induced voltage detector 40 detects a voltage across the first coil 22 or that across the second coil 24 when the driver unit 30 is in a high impedance state as viewed from the first coil 22 or the second coil 24, so as to thereby detect an induced voltage occurring in the first coil 22 or the second coil 24. An exemplary configuration of the induced voltage detector 40 will be discussed later.

"When the driver unit 30 is in a high impedance state as viewed from the first coil 22" means that all the transistors included in the H-bridge circuit driving the first coil 22 are turned off. "When the driver unit 30 is in a high impedance state as viewed from the second coil 24" means that all the transistors included in the H-bridge circuit driving the second coil 24 are turned off.

The control unit 10 adaptively adjusts the phase of the aforementioned induced voltage by adaptively varying the drive signal so that difference between the target value of the induced voltage occurring in the first coil 22 or the second coil 24 and the value of the induced voltage detected by the induced voltage detector 40 can be small. An exemplary configuration that achieves this phase adjustment will be described later.

Figure 3:
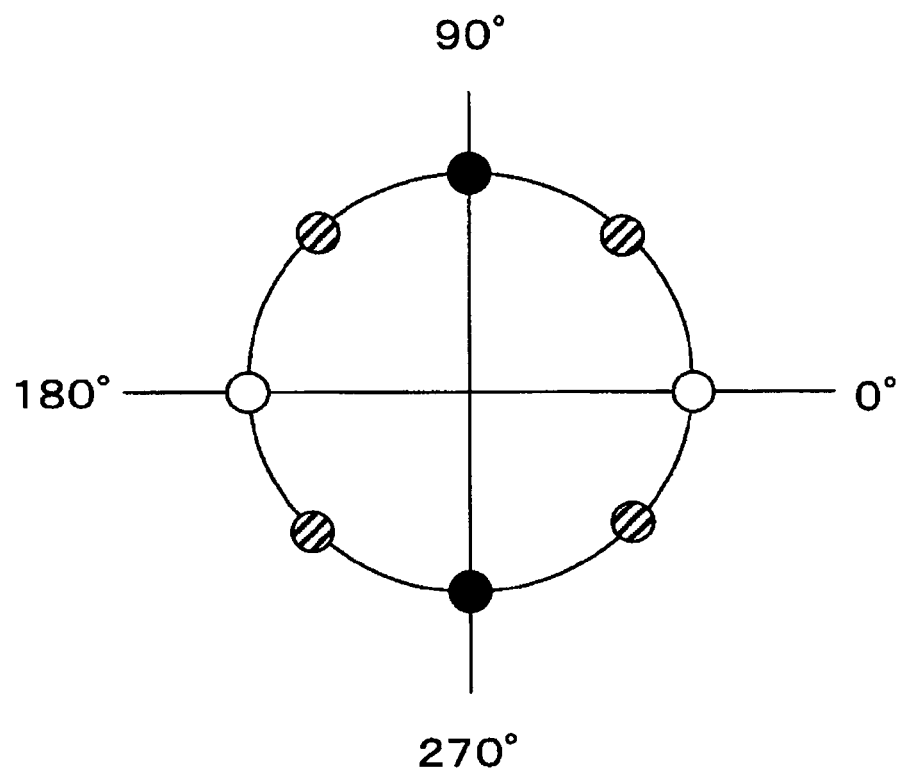
FIG. 3 illustrates a rotational phase of a stepping motor.

FIG. 3 illustrates a rotational phase of the stepping motor 200. The duty ratio of the drive current supplied to the first coil 22 is 100% when the rotational angle of the rotor 26 expressed by the electrical angle is 0 degree and 180 degrees. Also, the duty ratio thereof is 0% when the rotational angle thereof is 90 degrees and 270 degrees. Also, the duty ratio thereof is 71% when the rotational angle thereof is 45 degrees, 135 degrees, 225 degrees and 315 degrees. In the second coil 24, the relation between the duty ratio of the drive current and the rotational angle of the rotor 26 is such that it is displaced by 90 degrees relative to that of the first coil 22.

For example, in a 1-2 phase drive, the duty ratio of the drive current supplied to the first coil 22 is set as follows. For example, the duty ratio thereof transits in the order of 0%, 71%, 100%, 71%, 0%, 71%, 100%, 71% and 0%. That is, each rotation of the rotor 26 is divided into 8 phases and is controlled accordingly. The current for the second rotation at 100% is the reverse current relative to the current for the first rotation at 100%. Also, the current for the third and the fourth rotation at 71% is the reverse current relative to the current for the first and the second rotation at 71%.

The above-mentioned duty ratios are those derived on the assumption that the rotor 26 is driven at the maximum torque. If no sufficient current is supplied to the stepping motor 200, the power will not be enough to drive the stepping motor 200 and therefore a desired rotational accuracy may not be achieved. Thus, a large current is supplied in the conventional practice. Nevertheless, this drive method suffers a wasteful energy loss.

According to the present embodiment, control is performed such that the duty ratio is lowered according to the induced voltage detected by the induced voltage detector 40. For example, the duty ratio is lowered from 71% to 57% and lowered from 100% to 80%. The rate at which the respective duty ratios are reduced may not be the same.

Figure 4:
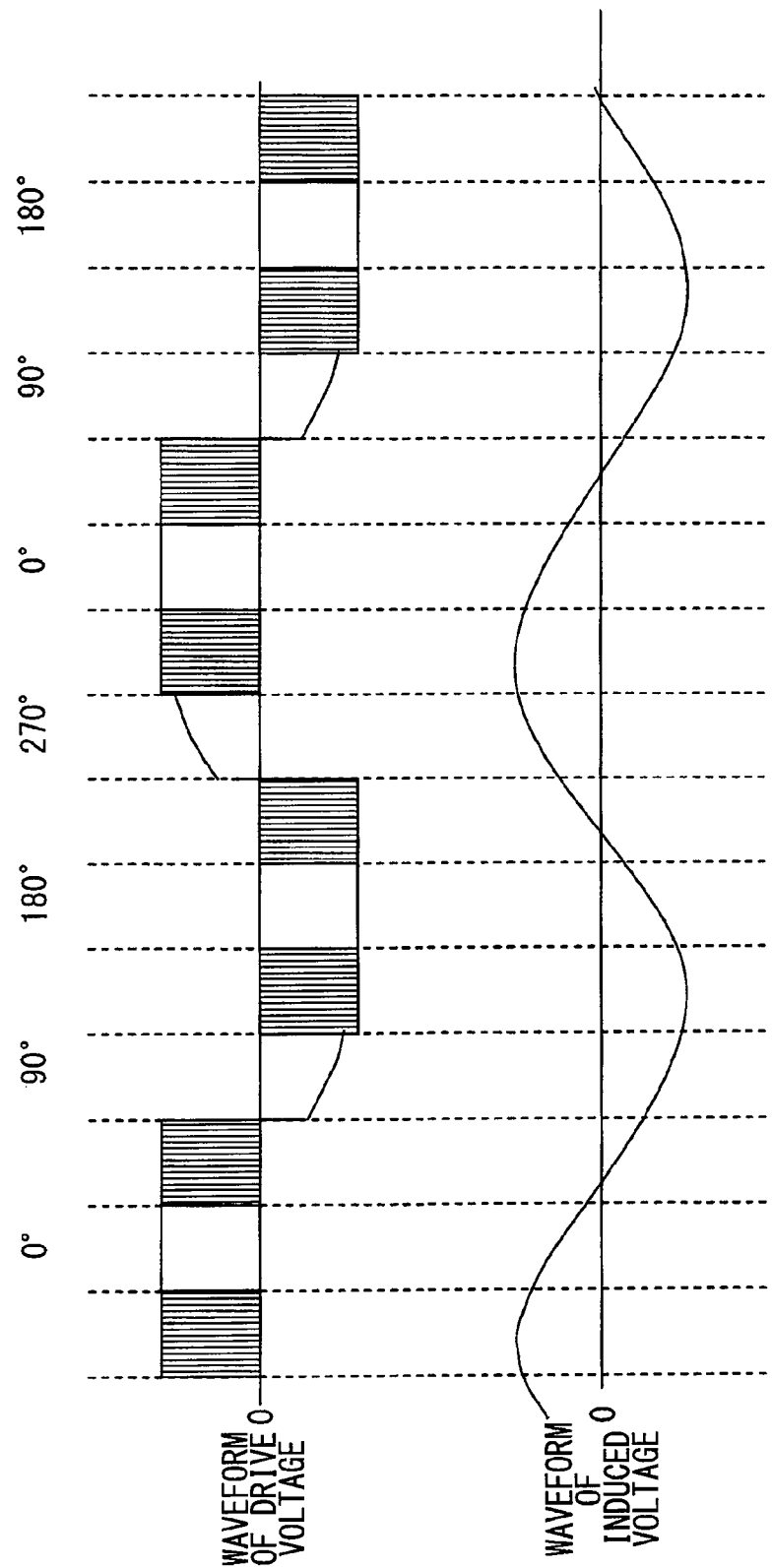
FIG. 4 is a graph (the torque level being high) showing a drive voltage waveform of a first coil and an induced voltage waveform thereof.

FIG. 4 is a graph (the torque level being high) showing a drive voltage waveform of the first coil 22 and an induced voltage waveform thereof. FIG. 4 shows an example where the first coil 22 is driven at a high torque with sufficiently supplied current. Though the waveform of induced voltage is not necessary a sine wave, it is expressed in FIG. 4 as a waveform close to a sine wave. The drive voltage waveform is depicted as a waveform indicating a potential difference across the first coil 22. When the rotational angle of the rotor 26 is 90 degrees and 270 degrees, the voltage supply to the first coil 22 is 0. The first to fourth transistors Q1 to Q4 included in the H-bridge circuit shown in FIG. 2 are all controlled to OFF and they are in a high impedance state. Thus, the waveform of induced voltage directly appears across the first coil 22.

In FIG. 4, the phase of the induced voltage waveform leads the phase of the drive voltage waveform. That is, the induced voltage waveform already crosses zero before it enters the high-impedance period. This is because the current flowing through second coil 24 is sufficiently large and therefore rotor 26 rotates at an early stage.

As the duty ratio of the drive voltage is lowered, the induced voltage waveform gradually approaches the phase of the drive voltage waveform. Then, the induced voltage waveform lags the drive voltage waveform immediately before the loss of synchronism. Then, the rotor 26 ceases to rotate and the induced voltage waveform is no longer obtained when the synchronism is lost.

Figure 5:
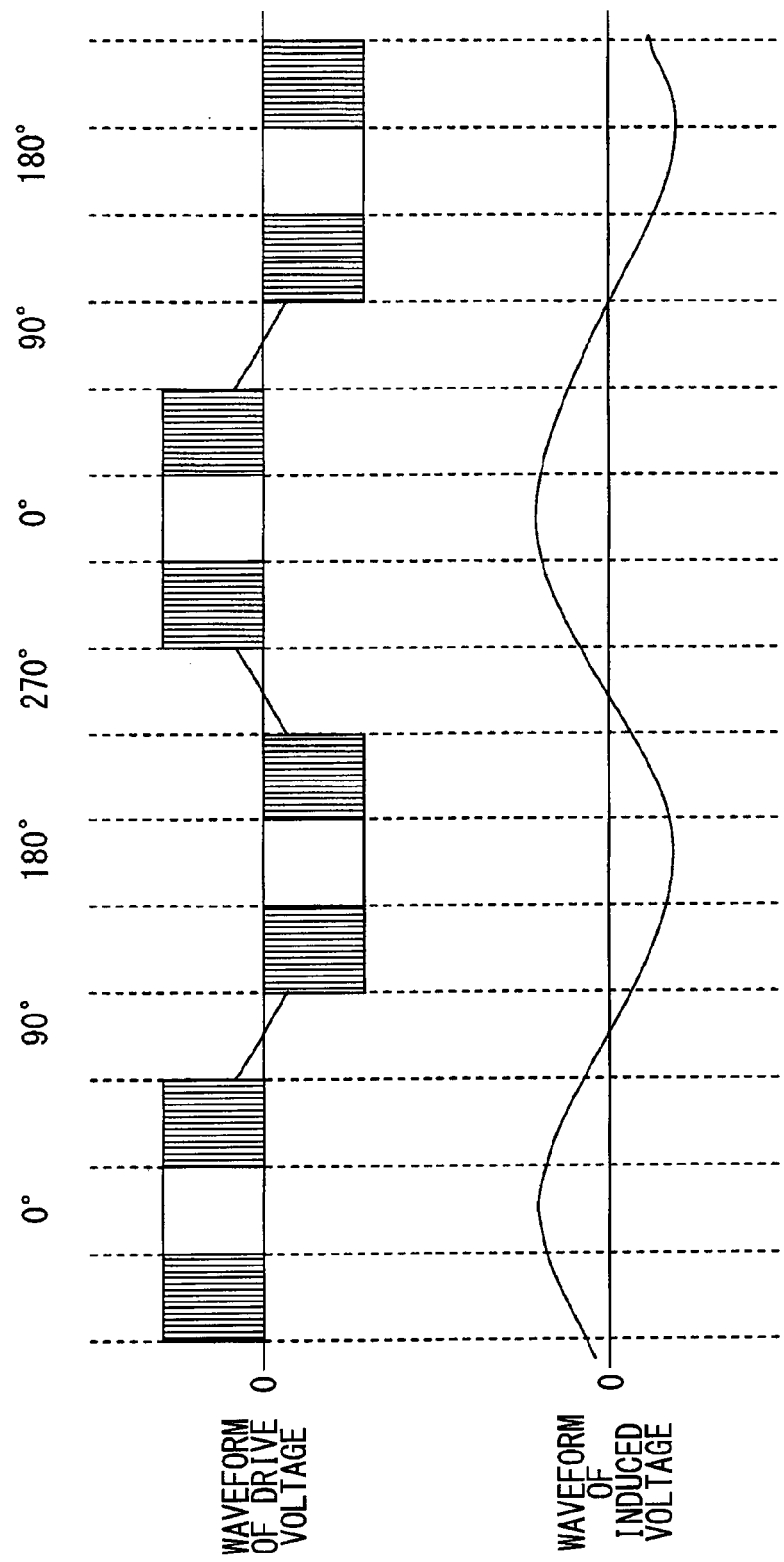
FIG. 5 is a graph (the torque level being appropriate) showing a drive voltage waveform of a first coil and an induced voltage waveform thereof.

FIG. 5 is a graph showing a drive voltage waveform of the first coil 22 and an induced voltage waveform thereof when the torque level is appropriate. FIG. 5 shows an example where the first coil 22 is driven by an appropriate torque with an appropriate current supplied to the first coil 22. In FIG. 5, the phase of the induced voltage waveform and the drive voltage waveform are approximately identical to each other. In other words, the induced voltage waveform crosses zero near the middle of a high-impedance period. Conversely, if the zero-cross occurs near the middle of a high-impedance period, it is considered to be an optimum drive from the viewpoint of both the rotational accuracy and the power consumption. In order to avoid the loss of synchronism due to a large variation in torque, a certain degree of margin may be set in the drive current.

In this manner, control is performed so that the phase of the induced voltage waveform is brought as close as possible to the phase of the drive voltage waveform, and therefore the power consumption can be reduced. A description is hereunder given of a detail configuration to achieve this.

Figure 6:
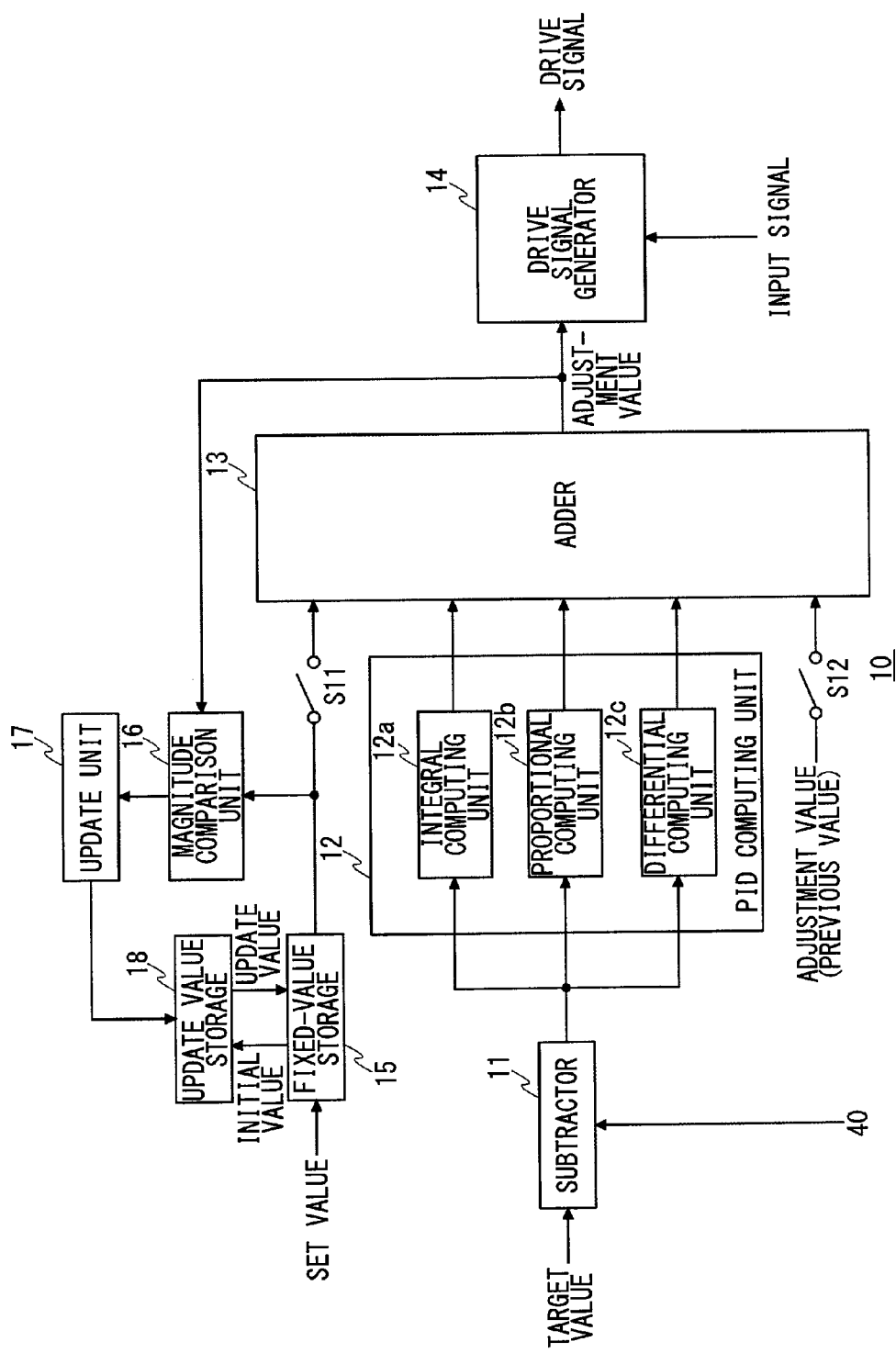
FIG. 6 illustrates an exemplary structure of a control unit.

FIG. 6 illustrates an exemplary structure of the control unit 10. In this exemplary structure shown in FIG. 6, the control unit 10 includes a subtractor 11, a PID computing unit 12, an adder 13, a drive signal generator 14, a fixed-value storage 15, a magnitude comparison unit 16, an update unit 17, an update value storage 18, a first mode selector switch S11, and a second mode selector switch S12.

The subtractor 11 computes the difference between a target value of the induced voltage and a value of the induced voltage detected by the induced voltage detector 40, and generates an error signal. In this case, the value of the induced voltage may be the exact value of the induced voltage or an amplified value thereof wherein the induced voltage is amplified by a predetermined gain as described later. In the latter case, the target value of the induced voltage is also set to the value amplified by the gain.

The target value of the induced voltage is set to an ideal value of an adjustment signal described later. The ideal value is a value derived based on experiments and simulation runs concerning the rotational control of the stepping motor 200. In other words, the ideal value is the value of the adjustment signal when the phase of the induced voltage waveform matches that of the drive voltage waveform, or a value which is the value of this adjustment signal added with a certain offset value.

Also, the target value and the output value may each be an analog value or digital value. In what is to follow, an example will be described where the target value and the output value will be specified by digital values.

The PID computing unit 12 performs PID computation on the error signal generated by the subtractor 11. The PID computing unit 12 includes an integral computing unit 12*a*, a proportional computing unit 12*b*, and a differential computing unit 12*c*. The integral computing unit 12*a* amplifies the inputted error signal by a predetermined gain, integrates the amplified error signals, and outputs the integration result. For example, the integral computing unit 12*a*, which includes a register for storing the previous output value, adds up the previous output value and the present input value (the input value after amplification), and sets the resulting value as the present output value. The proportional computing unit 12*b* amplifies the inputted error signal by a predetermined gain and outputs it. The differential computing unit 12*c* differentiates the inputted error, amplifies the differentiated error signal by a predetermined gain, and outputs it. For example, the differential computing unit 12*c*, which includes a register for storing the previous input value (the input value before amplification), computes the difference between the previous input value (the input value before amplification) and the present input value (the input value before amplification), amplifies the difference value and sets the amplified difference value as the present output value.

A user may optionally select any of the integral computing unit 12*a*, the proportional computing unit 12*b* and the differential computing unit 12*c*, as the computing unit/units to be enabled. For example, the user may use all of the three computing units by enabling them, use the proportional computing unit 12*b* alone by enabling it, or use the integral computing unit 12*a* and the proportional computing unit 12*b* only by enabling these two computing units.

The adder 13 adds up a signal or signals outputted from any enabled computing unit/units among the integral computing unit 12*a*, the proportional computing unit 12*b* and the differential computing unit 12*c* included in the PID computing unit 12, and generates the adjustment signal. At this time, the adder 13 further adds a fixed value inputted via the first mode selector switch S11 or the previous value of the adjustment value inputted via the second mode selector switch S12, to the signal or signals inputted from the PID computing unit 12 so as to generate an adjustment signal. This further added value will be later described in detail.

The drive signal generator 14 generates a drive signal, based on the input signal and the adjustment signal generated by the adder 13. In the present embodiment, the duty ratio of the PWM signal generated based on the input single is adjusted according to the adjustment signal. More specifically, if the total of signals outputted from the PID computing unit 12 is a positive value, the duty ratio of the PWM signal will be lowered and therefore the amount of currents supplied to the first coil 22 and the second coil 24 is reduced. If, on the other hand, the total value of signals outputted from the PID computing unit 12 is a negative value, the duty ratio of the PWM signal will be increased and therefore the amount of currents supplied to the first coil 22 and the second coil 24 is increased.

Also, the larger the absolute value of the adjustment value is, the larger the adjustment amount in the duty ratio of the PWM signal will be. Note that the conversion ratio between the value of the adjustment signal and the adjustment amount of the duty ratio of the PWM signal is set beforehand in the drive signal generator 14.

The fixed-value storage 15 stores a predetermined fixed value and outputs this fixed value to the adder 13. This fixed value is used as an initial value of the adjustment signal when the stepping motor 200 starts its operation. When the stepping motor 200 starts its operation, the adder 13 outputs the fixed value inputted from the fixed-value storage 15, to the drive signal generator 14 as the initial value of the adjustment signal.

Supplying the fixed value to the adder 13 allows a valid adjustment signal to be supplied to the drive signal generator 14 before the valid signal from the PID computing unit 12 is inputted to the adder 13. Even after the valid signal from the PID computing unit 12 has been inputted to the adder 13, the fixed value continues to be supplied to the adder 13 as an offset component.

The fixed value may be a unique value set externally or an adaptively-adjusted value. As an example of the former case, a value higher than the target value is set. If a value close to the target value is set in the former case, the adjustment of the phase can be started from the position close to the target value but the possibility of the occurrence of a loss of synchronism due to a lack of torque at the start of the rotation will be increased proportionately. If a value not close to the target value is set, the possibility of the occurrence of a loss of synchronism due to a lack of torque at the start of the rotation will be low. However, the adjustment of the phases is started from a position not close to the target value. Thus, a time duration required until the phase of the induced voltage is adjusted to an appropriate position is proportionately longer. A designer or user may set the fixed value by taking the above-described trade-off relation into consideration.

A description is now given of a configuration by which to adjust the above-described fixed value adaptively. The magnitude comparison unit 16 compares the fixed value stored in the fixed-value storage 15 against the value of the adjustment signal outputted from the adder 13 so as to determine the magnitude relation between the two values. The update unit 17 updates the fixed value in accordance with the comparison result obtained by the magnitude comparison unit 16.

The fixed value stored in the fixed-value storage 15 is set as the initial value in the update value storage 18. After this, the fixed value stored in the update value storage 18 is sequentially updated by the update unit 17. That is, the update value storage unit 18 holds an update value updated by the update unit 17. After the operation of the stepping motor 200 has been completed this time, the update value held in the update value storage unit 18 is set in the fixed-value storage 15 so as to become a new fixed value held in the fixed-value storage 15. This new fixed value is the initial value of the adjustment signal for the next operation of the stepping motor 200.

A detailed description is now given of an update processing where the fixed value held in the fixed value storage 15 is updated. In the following description, it is assumed that the induced voltage is sampled by the induced voltage detector 40 once in each high-impedance period. Thus, a new adjustment signal which has been updated is outputted from the adder 13 once in each high-impedance period. The designer or user may arbitrarily set the timing in a high-impedance period with which the induced voltage is sampled.

Figure 7:
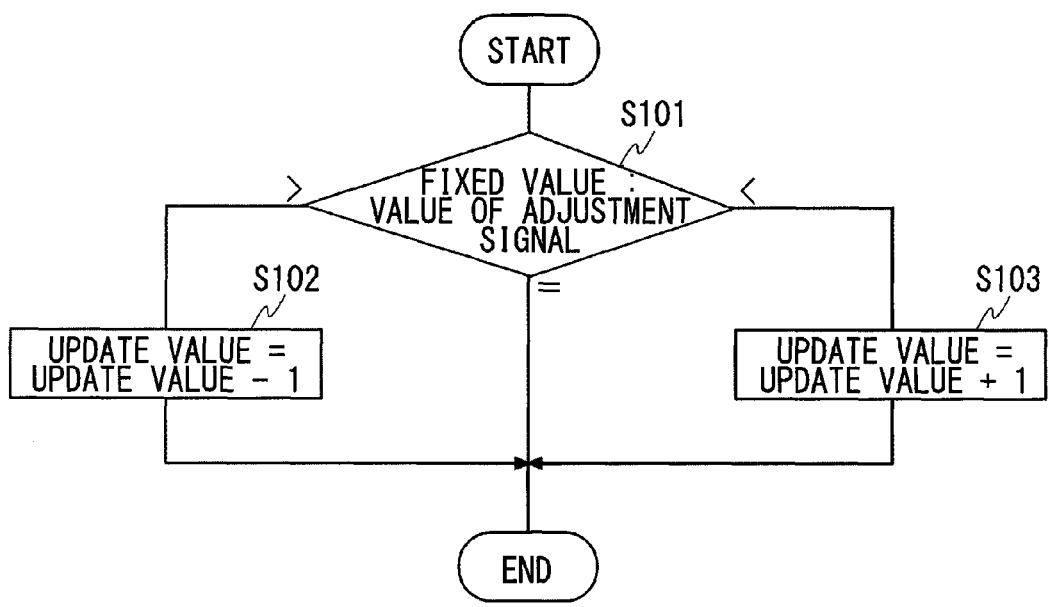
FIG. 7 is a flowchart for explaining a processing, performed by an update unit, for updating an update value stored in an update value storage.

FIG. 7 is a flowchart for explaining a processing, performed by the update unit 17, for updating the update value stored in the update value storage 18. The magnitude comparison unit 16 compares the fixed value held in the fixed-value storage 15 and the value of the adjustment signal outputted from the adder 13 within each phase controlled in a high-impedance state that first appears after the motor is driven (S101). If the fixed value is greater than the value of the adjustment signal (> of S101), the update unit 17 will decrement an update value, stored in the update value storage 18, with this fixed value as the initial value. If the fixed value is less than the value of the adjustment signal (< of S101), the update unit 17 will increment an update value, stored in the update value storage 18, with this fixed value as the initial value. If the fixed value equals the value of the adjustment signal (=of S101), the value held in update value storage 18 will not be updated.

A value which is added or subtracted in the above-described incrementing processing or decrementing processing may be a minimum control unit of the update value or may be a value greater than the minimum control unit thereof. For example, it may be ±1, ±2 or ±5.

Note here that the a feedforward control in which the fixed value held in the fixed value storage 15 is supplied to the adder 13 as the initial value of the adjustment signal is not the requisite control. And if the feedforward control is not used, the first mode selector switch S11 is turned off. In such a case, the fixed value is not added, to the adjustment signal as an offset component, by the adder 13. Instead, the second mode selector switch S12 is turned on and the previous value of the adjustment signal is supplied to the adder 13 as the offset component. If the feedforward control is used, the second mode selector switch S12 will be turned off.

Figure 8:
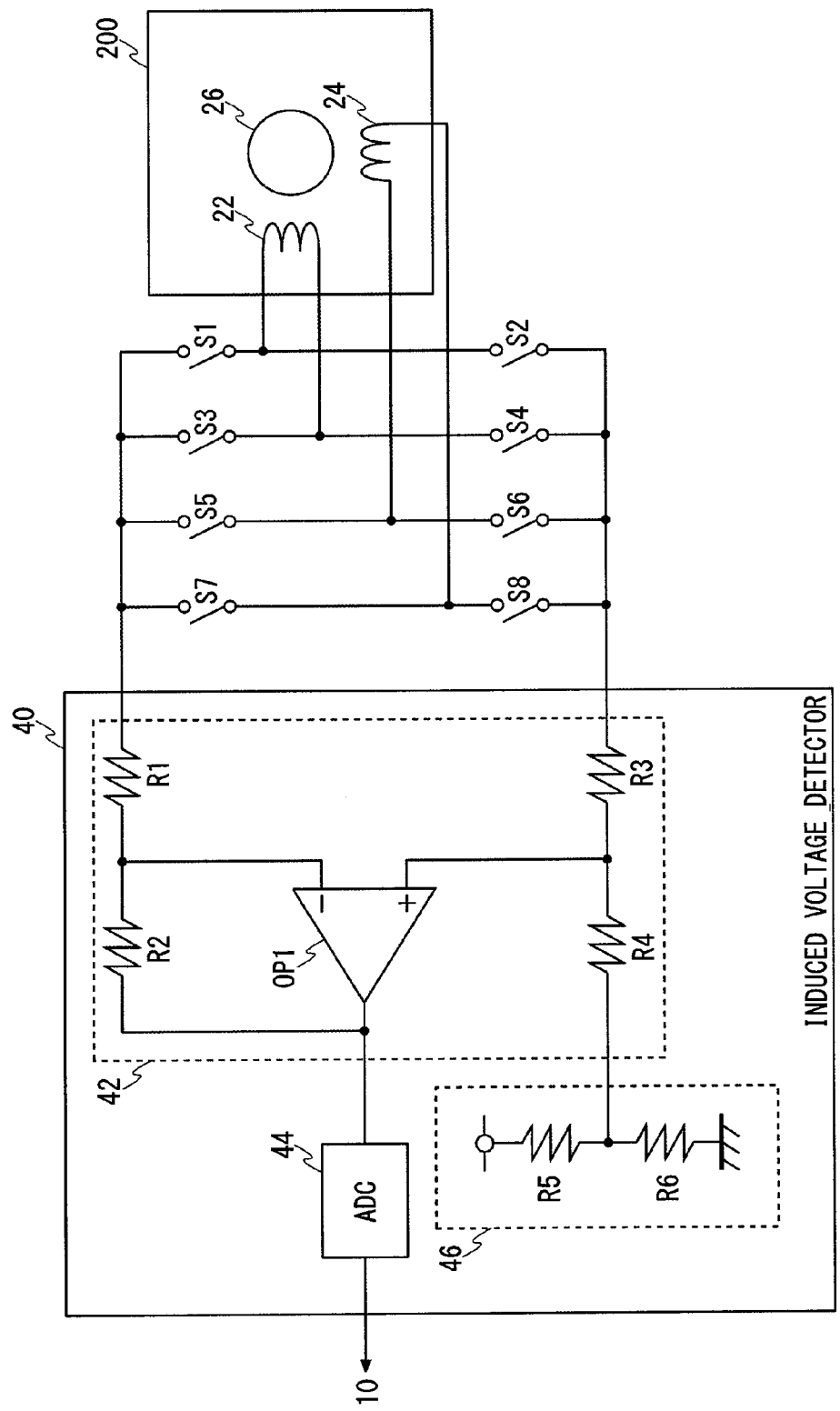
FIG. 8 illustrates a detailed structure of an induced voltage detector and a detailed connection relationship between a stepping motor and the induced voltage detector.

FIG. 8 illustrates a detailed structure of the induced voltage detector 40 and a detailed connection relationship between the stepping motor 200 and the induced voltage detector 40. The induced voltage detector 40 includes a differential amplifier circuit 42, and an analog-to-digital converter (ADC) circuit 44 and an offset generation circuit 46. The differential amplifier circuit 42 differentially amplifies the potential across the first coil 22 or the potential across the second coil 24, and outputs the differentially amplified potential to the ADC circuit 44. The ADC circuit 44 converts an analog value outputted from the differential amplifier 42, into a digital value so as to output the digital value to the control unit 10 (more precisely, the subtractor 11).

The control unit 10 adjusts the phase of the induced voltage by adaptively varying the drive signal in such a manner that the difference between the digital value based on the target value of the induced voltage and the digital value inputted from the ADC circuit 44 becomes smaller. Here, the digital value based on the target value of the induced voltage is a value obtained in such a manner that the target value is amplified in accordance with the gain of the differential amplifier circuit 42.

A detailed structure of the differential amplifier circuit 42 is now described. The differential amplifier circuit 42 includes an operational amplifier (op-amp) OP1, a first resistor R1, a second resistor R2, a third resistor R3, and a fourth resistor R4.

The potential at one end of the first coil 22 or the second coil 24 is inputted to an inverting input terminal of the op-amp OP1 via the first resistor R1. The inverting input terminal and the output terminal of the op-amp OP1 are connected to each other via the second resistor R2. The first resistor R1 and the second resistor R2 are connected in series with each other.

The potential at one end of the first coil 22 or the second coil 24 is inputted to an noninverting input terminal of the op-amp OP1 via the third resistor R3. Also, the noninverting input terminal of the op-amp OP1 is connected to the offset generation circuit 46 via the fourth resistor R4. The third resistor R3 and the fourth resistor R4 are connected in series with each other. If no offset generation circuit 46 is provided, the fourth resistor R4 will be grounded instead of being connected to the offset generation circuit 46.

The resistance value of the first resistor R1 and the resistance value of the third resistor R3 are set to the same value, whereas the resistance value of the second resistor R2 and the resistance value of the fourth resistor R4 are set to the same value. Under this condition, the gain of the differential amplifier circuit 42 is determined by R2/R1. The designer or user can adjust the gain of the differential amplifier circuit 42 by adjusting the resistance values of the first resistor R1 (or the third resistor R3) and the second resistor R2 (or the fourth resistor R4).

The offset generation circuit 46 includes a fifth resistor R5 and a sixth resistor R6. The fifth resistor R5 and the sixth resistor R6 are connected in series with each other, and this series circuit constituted by the fifth resistor R5 and the sixth resistor R6 are connected between the power supply and the ground. A voltage division point between the fifth resistor R5 and the sixth resistor R6 is connected to the fourth resistor R4. The designer or user can adjust an offset voltage to be added to the differential amplifier circuit 42, by adjusting the resistance values of the fifth resistor R5 and the sixth resistor R6 and thereby adjusting a voltage division ratio between the fifth resistor R5 and the sixth resistor R6.

A first switch S1 is a switch that electrically connects or disconnects the first terminal of the first coil 22 and the inverting input terminal of the differential amplifier circuit 42. A second switch S2 is a switch that electrically connects or disconnects the first terminal of the first coil 22 and the noninverting input terminal of the differential amplifier circuit 42. A third switch S3 is a switch that electrically connects or disconnects the second terminal of the first coil 22 and the inverting input terminal of the differential amplifier circuit 42. A fourth switch S4 is a switch that electrically connects or disconnects the second terminal of the first coil 22 and the noninverting input terminal of the differential amplifier circuit 42.

A fifth switch S5 is a switch that electrically connects or disconnects the first terminal of the second coil 24 and the inverting input terminal of the differential amplifier circuit 42. A sixth switch S6 is a switch that electrically connects or disconnects the first terminal of the second coil 24 and the noninverting input terminal of the differential amplifier circuit 42. A seventh switch S7 is a switch that electrically connects or disconnects the second terminal of the second coil 24 and the inverting input terminal of the differential amplifier circuit 42. An eighth switch S8 is a switch that electrically connects or disconnects the second terminal of the second coil 24 and the noninverting input terminal of the differential amplifier circuit 42.

If the induced voltage of the first coil 22 is detected, a first state and a second state will be alternately switched for each phase at which the driver unit 30 is controlled to a high-impedance state as viewed from the first coil 22. Here, the first state is a state where the first switch S1 is turned on and the second switch S2 is turned off and the third switch S3 is turned off and the fourth switch S4 is turned on. The second state is a state where the first switch S1 is turned off and the second switch S2 is turned on and the third switch S3 is turned on and the fourth switch S4 is turned off.

If the induced voltage of the second coil 24 is detected, a third state and a fourth state will be alternately switched for each phase at which the driver unit 30 is controlled to a high-impedance state as viewed from the second coil 24. Here, the third state is a state where the fifth switch S5 is turned on and the sixth switch S6 is turned off and the seventh switch S7 is turned off and the eighth switch S8 is turned on. The fourth state is a state where the fifth switch S5 is turned off and the sixth switch S6 is turned on and the seventh switch S7 is turned on and the eighth switch S8 is turned off.

In this control method, the polarity of the output voltages of the op-amp OP1 can be set to the positive polarity only, for instance, regardless of whether the induced voltage varies in a rising direction above zero or in a falling direction below zero. Thus, the output voltage range of the op-amp OP1 and the input voltage range of the ADC circuit 44 can be narrowed, so that the cost of the op-amp OP1 and the ADC circuit 44 can be suppressed. Since the polarity of the induced voltage is alternately switched for each phase at which the driver unit 30 is controlled to a high impedance state, polarity information can be easily added to the output digital value of the ADC circuit 44 at a stage subsequent to the ADC circuit 44.

If the polarity of the output voltages of the op-amp OP1 is not to be set to the positive polarity only or the negative polarity only, provision of the second switch S2, the third switch S3, the sixth switch S6 and the seventh switch S7 will no longer be required. Even with this configuration, the polarity thereof can be set to a single one if the induced voltage is sampled at every other phase. Note that the convergence time takes longer as compared to the case when the induced voltage is sampled at every phase.

By employing the present embodiment as described above, the stepping motor can be driven highly efficiently by detecting the induced voltage and thereby performing a feedback control so that the phase of the induced voltage is brought close to the phase of the drive voltage. That is, the power consumption can be reduced while the loss of synchronism is suppressed. Also, the PID control is used as the feedback control, so that a feedback control sensitively reflecting and suiting the user's needs can be achieved.

Also, the convergence time can be reduced if a feedforward control in which a predetermined fixed value is set to the initial value of the adjustment signal is performed at the start of the feedback control. Also, the convergence time can be further reduced if the fixed value is updated to attain an optimal value through a learning process.

Also, the circuit for the induced voltage detector is configured by the differential amplifier circuit and the ADC circuit, so that the induced voltage can be detected with accuracy. That is, though the induced voltage is of a small value in the stepping motor driven at a low voltage, the potentials at both ends of a coil are inputted to the two input terminals of the differential amplifier circuit and then differentially amplified thereby. Hence, the induced voltage can be detected with accuracy. Also, the detection result is converted into a digital value, so that the feedback control using the digital value can be performed and therefore the correction accuracy can be improved.

The description of the present invention given above is based upon illustrative embodiments. These embodiments are intended to be illustrative only and it will be obvious to those skilled in the art that various modifications to constituting elements and processes could be developed and that such modifications are also within the scope of the present invention.

In the above-described embodiments, a description has been given of an example where the induced voltage is sampled once for each phase controlled to a high impedance state. In a modification, the induced voltage may be sampled a plurality of times for every phase.

In the above-described embodiments, a description has been given of a case where the rotor is rotated using two stator coils. However, this should not be considered as limiting and, for example, the present embodiments are applicable to a stepping motor configured such that the rotor is rotated using three or more stator coils (e.g., four or eight stator coils).

What is claimed is:

1. A drive circuit for a motor having a first coil, a second coil and a rotor, the motor drive circuit comprising:
a driver unit configured to supply currents, whose phase differ from each other, to the first coil and the second coil, respectively;
an induced voltage detector configured to detect a voltage across the first coil or that across the second coil when said driver unit is in a high impedance state as viewed from the first coil or the second coil, and configured to detect an induced voltage occurring in the first coil or the second coil; and
a control unit configured to generate a drive signal based on an input signal set externally and adjust the drive signal in accordance with the induced voltage detected by said induced voltage detector so as to set the adjusted drive signal in said driver unit,
said induced voltage detector including: a differential amplifier circuit configured to differentially amplify an electric potential across the first coil or that across the second coil;
an analog-to-digital converter circuit configured to convert an analog value outputted from the differential amplifier circuit into a digital value and output the converted digital value to said control unit;
a first switch configured to connect or disconnect a first terminal of the first coil and a first input terminal of the differential amplifier circuit;
a second switch configured to connect or disconnect the first terminal of the first coil and a second input terminal of the differential amplifier circuit;
a third switch configured to connect or disconnect a second terminal of the first coil and the first input terminal of the differential amplifier circuit;
a fourth switch configured to connect or disconnect the second terminal of the first coil and the second input terminal of the differential amplifier circuit;
a fifth switch configured to connect or disconnect a first terminal of the second coil and the first input terminal of the differential amplifier circuit;
a sixth switch configured to connect or disconnect the first terminal of the second coil and the second input terminal of the differential amplifier circuit;

a seventh switch configured to connect or disconnect a second terminal of the second coil and the first input terminal of the differential amplifier circuit; and an eighth switch configured to connect or disconnect the second terminal of the second coil and the second input terminal of the differential amplifier circuit.

2. A motor drive circuit according to claim 1, wherein said control unit adjusts the phase of the induced voltage by adaptively varying the drive signal in such a manner that a difference between the digital value based on a target value of the induced voltage and the digital value inputted from the analog-to-digital converter circuit becomes small.

3. A motor drive circuit according to claim 1, wherein when the induced voltage of the first coil is detected, a first state and a second state are alternately switched for each phase at which said driver unit is controlled to the high impedance state as viewed from the first coil, the first state being a state where said first switch is turned on and said second switch is turned off and said third switch is turned off and said fourth switch is turned on and the second state being a state where said first switch is turned off and said second switch is turned on and said third switch is turned on and said fourth switch is turned off, and wherein when the induced voltage of the second coil is detected, a third state and a fourth state are alternately switched for each phase at which said driver unit is controlled to the high impedance state as viewed from the second coil, the third state being a state where said fifth switch is turned on and said sixth switch is turned off and said seventh switch is turned off and said eighth switch is turned on and the fourth state being a state where said fifth switch is turned off and said sixth switch is turned on and said seventh switch is turned on and said eighth switch is turned off.

4. A motor drive circuit according to claim 1, wherein the motor is a stepping motor.

* * * * *